Patented June 22, 1943

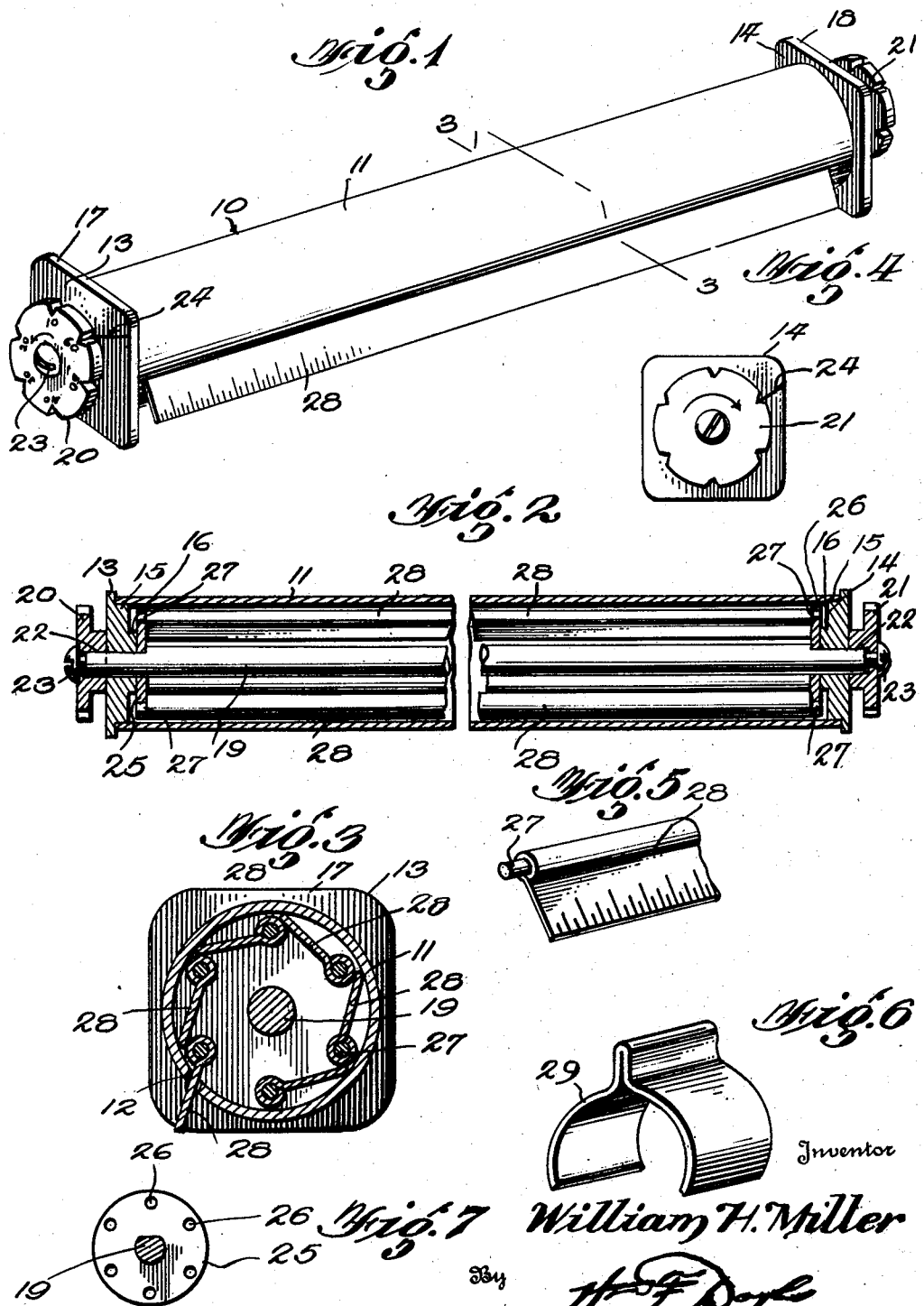

2,322,248

UNITED STATES PATENT OFFICE 2,322,248

COMBINATION SELECTIVE SCALE

William H. Miller, Washington, D. C.

Application August 29, 1941, Serial No. 408,699

2 Claims. (Cl. 33—107)

(Granted under the act of March 3, 1883, as amended April 30, 1928; 370 O. G. 757)

The invention described herein, if patented, may be manufactured and used by or for the Government for governmental purposes without the payment of any royalty thereon.

This invention relates to and has for a purpose the provision of a combination architect's and engineer's selective scale, and more particularly, an instrument designed with the idea of incorporating two sets of scales into one instrument.

The important object of the invention is to provide a device that will enable the operator to select any one of two scales and retain such selected scale in a visible position until the need for a different scale should arise.

Another object of the invention is to provide a simple, practical and efficient type of construction, which shall permit the separate scales to be easily and quickly drawn out of the holder for use and as readily returned, and which will permit any desired scale to be drawn out into the same position where a previous scale has been drawn.

A further object of the invention is to provide a construction which is adapted to hold reversible scales, which may be reversed to permit either side of the scales to be viewed.

With the above and other objectives and advantages in view, the invention consists of features of construction arrangement and operation of parts which will appear in the specification and be finally pointed out in the claims.

While a preferred embodiment of the invention is shown, it will be understood that slight changes in form and minor details of construction may be resorted to without departing from the spirit of the invention and fall beyond the scope of the claims.

Referring now to the drawing in which similar characters and references in the several figures identify identical parts:

Fig. 1 is a perspective view of the device.

Fig. 2 is a sectional view of the apparatus through the center thereof.

Fig. 3 is an enlarged transverse section on line 3—3 of Fig. 1.

Fig. 4 is the opposite end of the device not shown in Fig. 1.

Fig. 5 is a detailed fragmentary section of one of the scales.

Fig. 6 is a perspective view of the grip.

Fig. 7 is a detailed view of a scale holder.

Reference now being had to the drawing by numerals in which 10 indicates the complete assembly, which consists of a tube 11 which may be made of metal, transparent plastic or similar materials. The tube 11 has a slot 12 which extends from a point near one end to a corresponding point near the opposite end. Into the ends of the tube 11 are fitted the end pieces 13 and 14. These end pieces have formed thereon cylindrical projections 15 and 16. Projections 15 are adapted to receive the tube 11 and thereby retain the tube in proper position in relation to the outer perimeters 17 and 18 of the end pieces 13 and 14. The end pieces 13 and 14 comprise the end bearings for the shaft 19, which is of such length as to extend beyond the end pieces 13 and 14 to such a distance as to permit the placement of the selectors 20 and 21 on the flattened ends 22 of the shaft 19. The selectors 20 and 21 are held in place on the shaft 19 by means of screws 23 which screws also tend to adjust the tightness of the assembly. By this means the shaft will hold the tube in place. The end pieces 13 and 14 differ only in regard to the selector line 24 appearing on the outer surface of each piece. End piece 13 has the selector line 24 extending upward to the right and is used in conjunction with the engineer's scale. End piece 14 has the selector line 24 extending upward to the left and is used in conjunction with the architect's scale A.

The end pieces 13 and 14 are so made that the perimeters 17 and 18 form a square, each side of which is slightly larger than the diameter of the tube 11, thus permitting the placing of the device on a flat or inclined surface without danger of the device rolling or rotating thereon.

Inside the tube 11 and secured to the shaft 19 by reason of the flattened ends 22 are two scale holders 25 which are properly spaced within the tube 11 by means of projections 16 on the end pieces 13 and 14. Near the outer end of the scale holders 25 there are a series of holes or openings 26 adapted to receive pins 27, which are rolled into the opposite edges of the scales 28 the scales 28 and the engineer's scale on side E and the architect's scale A on the opposite side. The pins 27 fit loosely into the openings or holes 26 of the scale holders 25 so as to permit free hinging of the scales 28, thereby permitting the scale selected by the operator to drop through the slot 12 in the tube 11 when the selected scale is placed in use.

When the device is assembled care must be taken so that both sets of scales are properly inserted so that they will conform with the arrangement of the selector lines 24 on the selectors 20 and 21. As an optional part of the device which may be added to the assembly 10 is the grip 29 shown in Fig. 6 which can be sprung over the tube 11 when the device is in use and which may be attached or removed at will.

The operation of the device can now be readily understood. When a given engineer's scale E is desired the selector 20 is turned in the direction of the arrow thereon until the notch at the desired scale marking appears at the selector line on the end piece 13. The action is then reversed so that the desired scale will project through the slot 12 in the tube 11. The scale 28 is then brought to the desired angle of use and will remain in this position until withdrawn into the tube 11 by again turning the selector 20 in the direction of the arrow.

When a given architect's scale on side A of scale 28 is desired, the device must be bodily rotated in a vertical plane on a horizontal axis through 180 degrees from the position shown in Fig. 1, thereby placing selector 21 on the manipulators left with the straight edge of the scale 28 pointed upwardly (which would be equivalent to viewing Fig. 1 from beneath the position shown). Now, if the scale is permitted to pivot downwardly along the longitudinal axis of the pins 27, the architect's scale A will become visible and the straight edge thereof will be pointed downwardly and the reversed or architect's side A of the scale would be ready for use. When a new scale is desired, the operation of the device would be the same as previously described, except that the selector 21 is turned in the direction of the arrow thereon until the notch at the desired scale marking on the side A appears at the selector line on the end piece 14.

The screws 23 in the ends of the shaft 19 should be so adjusted that sufficient tension is exerted on the complete assembly 10 to hold the desired scale in position while in use.

The architect's scales A are graduated and identified in the conventional manner and appear on the sides of the scales when the assembly is placed, as shown in Fig. 1.

The engineer's scales E are graduated and identified in the conventional manner and appear on the sides of the scales opposite the architect's scales. As previously stated, both sets of scales must be assembled so as to rotate in the same sequence as the markings on the selectors.

The invention therefore, exemplifies a combination architect's and engineer's scale, which enables an expeditious operation in the use of both scales, which is a great advancement over the old method of using two separate scales.

It will be understood, therefore, by those skilled in the art, that the embodiment of the invention herein disclosed accomplishes the principal object of the invention. It also has uses and advantages other than those herein particularly referred to, since the scales used in the explanation of the device may be supplemented or changed to other scales without departing from the scope of the invention. Also, various changes and modifications may be made without departing from the spirit of the invention and since the embodiment disclosed herein, being only illustrative of the device, the invention is not to be restricted thereto, since this may be modified within the scope of the appended claims without departing from the spirit and scope of the invention.

Having thus described the invention, what is claimed as new and desired to secure by Letters Patent is:

1. A combination architect's and engineer's selective scale comprising a frame composed of two quadrilateral end pieces having a cylindrical body interposed between said end pieces, an elongated opening therein, removable and interchangeable scales, a shaft lying longitudinally of said frame, having circular scale holders attached thereto, said scale holders adapted to receive pins, that are inserted into the ends of the removable and interchangeable scales, in a series of openings equi-distantly spaced around the circumference of said circular scale holders and selectors on the end of said shaft for rotating said circular scale holders to bring said scale holders selectively opposite the said opening, thereby placing said scales in an operative position.

2. A combination architect's and engineer's selective scale comprising a frame, the perimeter thereof being formed in such a manner that said frame is adapted to remain immovable on an inclined surface, an elongated opening in said frame, circular scale holders in said frame adapted to receive pins, inserted into the ends of removable and interchangeable scales, a shaft running longitudinally of said frame having said circular scale holders attached thereto, said scale holders having openings therein to receive the pins that are inserted into the ends of said removable and interchangeable scales, and selectors attached to the ends of said shaft for rotating said circular scale holders to bring said scale selectively opposite the said opening, thereby placing said scale in an operative position outside of said frame.

WILLIAM H. MILLER.